United States Patent [19]
Yquel et al.

[11] Patent Number: 5,975,356
[45] Date of Patent: Nov. 2, 1999

[54] DISPENSER FOR A PRODUCT OF A LIQUID TO PASTY CONSISTENCY COMPRISING A SAFETY DEVICE

[75] Inventors: Jean-Pierre Yquel, Colombes; Pierre-Andre Lasserre, Coubron, both of France

[73] Assignee: L'Oreal, Paris, France

[21] Appl. No.: 09/283,234

[22] Filed: Apr. 1, 1999

Related U.S. Application Data

[63] Continuation of application No. 08/780,903, Jan. 9, 1997.

[30] Foreign Application Priority Data

Jan. 10, 1996 [FR] France ................................ 96-00221

[51] Int. Cl.⁶ .................................................. B65D 83/14
[52] U.S. Cl. ........................ 222/54; 222/397; 222/402.1
[58] Field of Search ............................ 222/54, 396, 397, 222/402.1

[56] References Cited

U.S. PATENT DOCUMENTS

| | | | |
|---|---|---|---|
| 2,822,961 | 2/1958 | Seaquist | 222/397 |
| 3,168,210 | 2/1965 | Williams | 222/396 X |
| 3,245,578 | 4/1966 | Sutton | 222/397 X |
| 3,283,960 | 11/1966 | Williams | 222/397 |
| 3,385,481 | 5/1968 | Frangos | 222/396 |
| 3,450,305 | 6/1969 | Kinnavy et al. | 222/397 X |
| 3,472,427 | 10/1969 | Schaefer | 222/396 X |
| 3,520,368 | 7/1970 | Hayes | 222/396 X |
| 4,147,272 | 4/1979 | Stenner et al. | 222/397 X |
| 4,407,432 | 10/1983 | Shichman | 222/397 |
| 5,154,201 | 10/1992 | Yanagihara et al. | 137/15 |
| 5,199,615 | 4/1993 | Downing et al. | 222/402.1 X |

FOREIGN PATENT DOCUMENTS

| | | | |
|---|---|---|---|
| 2214288 | 8/1974 | France | 222/397 |
| 2 685 303 | 6/1993 | France . | |
| 91 11 351 | 11/1991 | Germany . | |
| 2-214555 | 8/1990 | Japan . | |
| 5-65181 | 3/1993 | Japan | 222/54 |
| 563 926 | 7/1975 | Switzerland | 222/396 |

*Primary Examiner*—Kenneth Bomberg
*Attorney, Agent, or Firm*—Young & Thompson

[57] ABSTRACT

A pressurized container (1) containing a fluid product to be dispensed and a propellant gas. The container includes a valve for dispensing the product that includes a heat-sensitive safety device (D) for opening the valve and causing the inside of the container to permanently communicate with the atmosphere when the temperature inside the container exceeds a predetermined threshold temperature. The safety device (D) includes a stopper (106) made of a material that is thermodeformable at the threshold temperature. The stopper closes an orifice (105) in an actuating stem of the valve when the threshold temperature is not exceeded, and opens the orifice when the threshold temperature is exceeded.

3 Claims, 2 Drawing Sheets

DISPENSER FOR A PRODUCT OF A LIQUID TO PASTY CONSISTENCY COMPRISING A SAFETY DEVICE

CROSS-REFERENCE TO RELATED APPLICATIONS

This application is a continuation of copending application Ser. No. 08/780,903, filed Jan. 9, 1997.

BACKGROUND OF THE INVENTION

The present invention relates to a pressurized container containing a fluid product to be dispensed and also a propellant gas, this container being provided with a safety device preventing the risks of excessive pressures when the ambient temperature rises. The object of the invention is, more particularly, the use of a container made of a metallic or plastic material provided with such a safety device.

Generally, pressurized containers of this kind are used in different fields of application and contain, for example, cosmetic products, industrial products or household products. These products are not always used in ideal conditions. Indeed it happens rather frequently that such a product is stored and/or used at high temperatures, for example, in full sunlight.

It is known that with an increase in the ambient temperature the internal pressure in a pressurized container increases substantially, in particular when it contains a liquefied propellant gas. In extreme conditions, there is the risk that the excessive pressure produced by high temperatures will then cause the container to burst and thus cause injuries to the user.

Generally, the pressurized container presently used for the dispensing of a fluid product are constituted by an aluminium can or a tin can. These metal cans are not sensitive to heat. The pressurized cans made of a plastic material are at present not used, because it is also known that the plastic materials intended for these cans do not withstand high temperatures. Indeed, these plastic materials start to soften above a critical threshold temperature (in particular upwards from 50° C.).

When it is intended to replace a metal container by a plastic container, a certain number of precautions have therefore to be taken. To avoid any risk of deterioration of the container, it is necessary, for example, to depressurize the container before the inside of the container accidentally reaches the critical temperature, this depressurization having to be effected at a specified temperature in an extremely reliable and reproducible manner.

A container comprising a safety device which ensures this depressurization has already been proposed, for example, in our FR-A-2685303. This device is provided with a wall having an orifice closed by an elastomeric stopper, the exposure to atmospheric pressure being effected by means of a fixed element, by rupture of a fragile zone of the stopper, this zone being disposed in the container and being displaced solely under the effect of the internal pressure. However, tests have shown that it is difficult to control in a reliable manner the conditions of the rupture of the fragile zone. Moreover, the assembly of such a container entails additional manufacturing costs which are relatively high.

Moreover, U.S. Pat. No. 4,407,432 discloses a pressurized container which has a device for exposure to atmospheric pressure and a push button mounted on a dispensing valve, this container increasing in volume when a predetermined threshold temperature has been reached. This container is mounted in a frame, so that due to the increase in volume of the container, pressure is exerted on the push button producing the ejection of the product through the valve in the direction towards the push button. The push button includes a dispensing conduit and a duct for exposure to the atmospheric pressure, obturated by a thermofusible stopper. When the critical temperature is reached, this button melts and produces the depressurization of the container. The container mounted in the frame has the drawback of being bulky, inconvenient and expensive.

SUMMARY OF THE INVENTIONS

In searching for a safety device that is very reliable and easy to use, the Applicant has found that by using a valve provided with a safety device having a stopper made of a material which is thermodeformable, even thermofusible, at a specified threshold temperature, it was possible, surprisingly, to control with great reliability the accidental excessive pressure in a pressurized container, which pressure is produced by excessive heat. Moreover, the solution proposed by the present invention is simple to obtain and is economically advantageous.

Thus it is the object of the present invention to provide a pressurized container containing a fluid product to be dispensed and also a propellant gas, this container being provided with a heat-sensitive safety device.

Thus the present invention provides a pressurized container containing a fluid product to be dispensed and a propellant gas, this container being provided with a valve for dispensing the product, this valve being fitted with a heat-sensitive device capable of causing the valve to open and of causing the inside of the container to permanently communicate with the atmosphere when the temperature inside the container exceeds a predetermined threshold temperature.

Generally, the container comprises a bottom and, if applicable, a fastening cup which is mounted on the end opposite to the bottom and is intended to fix the dispensing valve on the container.

Advantageously, the safety device is constituted by a stopper (or a partition) made of a material that is thermodeformable at and above the threshold temperature, this stopper (or the partition) (i) normally obturating, at the ambient temperature, an orifice which causes the inside of the container to communicate with the atmosphere, and (ii) releasing this orifice when the threshold temperature has been exceeded.

This orifice is, in particular, arranged in the wall of an actuating stem slidably mounted in the valve, actuation of this stem being capable of causing the ejection of a dose of the product. More precisely, the orifice is formed in that portion of the valve stem which is accommodated inside the valve body. The actuation of the valve is preferably effected by axial depression of the actuating stem. However, it is also possible to choose a stem capable of being actuated by lateral rocking. In accordance with the invention, the orifice may be arranged either at the bottom of the stem or in its side wall.

Advantageously, the diameter of the orifice may vary between 0.1 mm and 2.5 mm. This orifice is obturated by a stopper of a material which is thermodeformable, or even thermofusible.

Thus, when the container is exposed to heat, the internal temperature of the container rises, entailing an increase in the internal pressure. When the threshold temperature has been reached or exceeded, the thermodeformable material softens or is liquefied and unblocks the passage between the inside of the container and the atmosphere. The safety device of the invention then becomes operational. Under the thrust of the internal pressure, the propellant gas and/or the product escape into the atmosphere via the valve stem until the container has been completely depressurized.

In accordance with the above two embodiments, the thermodeformable material is advantageously chosen from materials having a softening point, even a melting point, comprised in the range extending from 45° C. to 85° C. Below this temperature this material is solid, capable of securely adhering to the wall surrounding the orifice. Preferably, this thermodeformable material is a thermofusible material. More precisely it is chosen from materials whose softening point or melting point is below that constituting the wall of the container.

Advantageously, the thermodeformable or thermofusible material is chosen from metal alloys, polymers, waxes, paraffins and their associations. In particular, this material may be chosen from the polymers of the vinyl ethylene/acetate copolymer-type; polymers and two-constituent epoxy resins having a vitreous transition temperature comprised between 20° C. and 85° C., and preferably between 45° C. and 80° C.; resins which are cross-linkable under the effect of an ultraviolet source; synthetic waxes such as "Dapral W440" and "Dapral W447" sold by the AKZO-NOBEL Company or "Cire [wax] BJ" sold by the HOECHST Company; natural waxes such as beeswax, carnauba wax or candellia wax; paraffins having a melting point comprised between 60° C. and 80° C.; Wood alloy (50% Bi, 25% Pb, 12.5% Sn and 12.5% Cd); Lipowitz alloy (50% Bi, 26.7% Pb, 13.3% Sn and 10% Cd); eutectics such as the binary eutectic of In (67%) and Bi (33%), the ternary eutectic of In (51%), Bi (32.5%) and Sn (16.5%) and the quaternary eutectic of Bi (49.5%), Pb (17.5% ), Sn (11.6%) and In (21.3%).

According to another variant of the embodiments, the stopper may be constituted by a membrane obturating the internal passage of the valve stem, and capable of softening when the internal temperature of the container exceeds the threshold temperature. The increase in temperature entails in this case an increase in the internal pressure in the container, producing the deformation and the displacement of the membrane, a perforator being provided so as to pierce the membrane when this displacement occurs. Advantageously, this perforator has a hollow internal passage one of whose ends communicates with the outside of the container. After the membrane has been pierced by the perforator, the pressurized gas passes through the orifice thus created, then escapes into the atmosphere via the internal passage of the perforator.

Irrespective of the particular embodiment, the container may advantageously be made of a plastic material, such as, for example, PET (polyethylene-terephthalate), PEN (polyethylene-naphthalate) or PMP (polymethyl pentene), but it can also be made of aluminium, of tin, or of glass.

BRIEF DESCRIPTION OF THE DRAWINGS

To render the present invention more readily understood, several embodiments will be described below by way of purely illustrative and nonrestrictive examples, represented in the attached drawings, in which.

DESCRIPTION OF THE PREFERRED EMBODIMENTS

Figure 1:
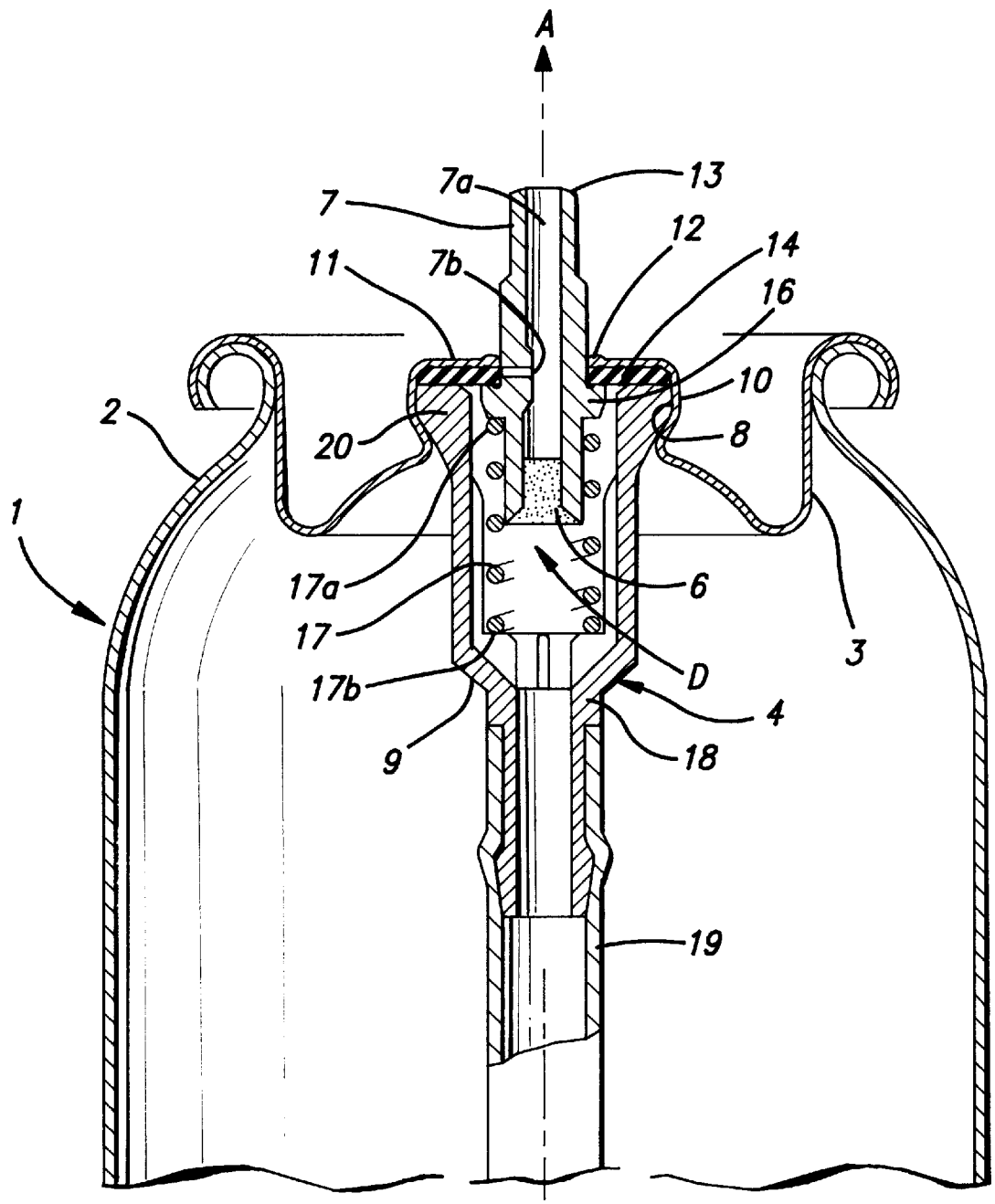
FIG. 1 shows a partial axial section of a pressurized container provided with a valve, fitted with a safety device in accordance with the invention comprising a thermofusible stopper.

In FIG. 1 there will be seen a partial longitudinal section of a cylindrical container 1 elongated along a longitudinal axis A, comprising a neck 2 on which a conventional metal valve carrier cup 3 is fixed by crimping or flanging. This container contains a liquid product to be dispensed, and a pressurized propellant gas. At its center, the cup 3 has a recess 8 for receiving a valve 4. This recess 8 is radially delimited by a cylindrical wall 10 of revolution round axis A. This wall 10 is extended in an upper wall 11, generally planar and perpendicular to the axis A, traversed at its center by a passage 12. The cup 3 may be produced by cutting out and stamping a metal disk.

The valve 4 has a valve body 9 and an actuating stem 7 capable of being displaced in this body along this axis A. The stem 7 passes through the passage 12 of the cup 3. A dispensing duct 7a is arranged in the stem 7 for passing outwardly the product to be dispensed. This duct 7a, provided at its lower portion with an orifice 5 obturated by a stopper 6, is a blind passage extending along the direction of the axis A and connected to a radial duct 7b passing through the wall of the stem 7. The blind duct 7a opens out in the emergent end 13 of the stem 7 situated outside the container. When the valve is in its rest position, the radial duct 7b opens out at its outer end opposite an annular gasket 14, or in its dispensing position in a valve chamber 15 inside the valve body 9.

The stem is provided with a radial projection 16 bearing in the closed position of the valve on the gasket 14. At the edge turned towards the container, this projection 16 bears resiliently against an end 17a of a helical spring 17 constituting resilient restoring means.

The valve body 9 is substantially cylindrical and has an open bottom 18 connected to a tube 19 capable of causing the valve chamber 15 to communicate with the product contained in the container 1. This bottom supports the other end 17b of the spring 17 with fins 21.

On the end away from the bottom, the body 9 has, moreover, an external annular bead 20 engaged in the recess 8 of the cup 3 and in a leakproof bearing contact with the circumference of the gasket 14. The annular gasket 14 bears against the wall 11 of the cup and at its circumference comes into contact with the wall 10. The fit between the gasket 14 and the stem 7 is tight, so as to ensure the leakproof sliding of the latter.

The bottom of the stem 7 is closed by the stopper 6. This stopper is made of a thermodeformable or thermofusible material, for example, polyethylene terephtalate. The rest of the stem 7 is made of a rigid plastic material, for example, polypropylene.

The opening of this valve is effected in the conventional manner by depressing the stem. During this depression, the radial duct 7b is unblocked, and the product flows under the thrust of the propellant gas through the axial passage 7a via the valve chamber 15.

The stopper 6 constitutes a safety device D in accordance with the invention which functions as follows. In fact, when the inside of the container reaches a high temperature, for example, 60° C., the material of the stopper 6 melts. The bottom of the stem 7 is then released and the pressurized propellant gas can escape through the axial duct 7a until the gas has been completely discharged.

Figure 2:
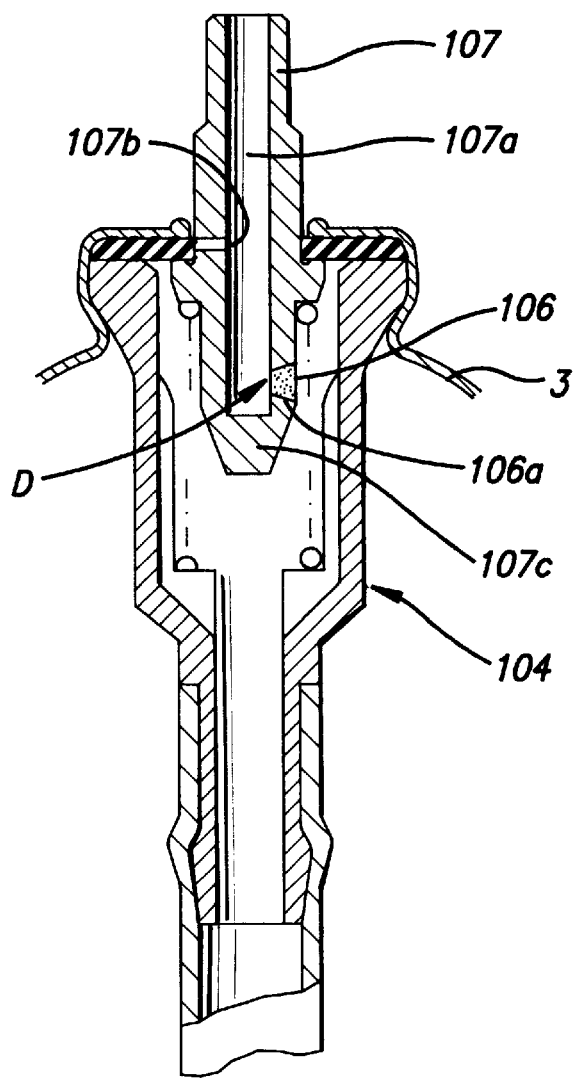
FIG. 2 shows a partial axial section of a pressurized container provided with a valve in accordance with the invention, according to a variant of the embodiment of FIG. 1.

FIG. 2 shows a variant of the embodiment of the safety device of FIG. 1. The parts that are identical or perform a similar function bear the same reference numerals as those of FIG. 1, increased by 100. The description of the identical parts will only be briefly repeated.

Thus, FIG. 2 shows a valve 104 crimped in a cup 3. As compared with FIG. 1, it is only the actuating stem 107 that is different from the stem 7 of FIG. 1. It carries a closed bottom 107c moulded integrally with the rest of the stem. In the vicinity of this bottom 107c, a lateral orifice 105 is provided in the wall of the stem communicating with a blind axial passage 107a of the stem.

The orifice 105 is closed by a stopper 106 made of a thermodeformable or thermofusible material in a way similar to the stopper 6 of the embodiment of FIG. 1. This stopper 106 constitutes a safety device D in accordance with the invention which functions in a way similar to that of FIG. 1.

Figure 3:
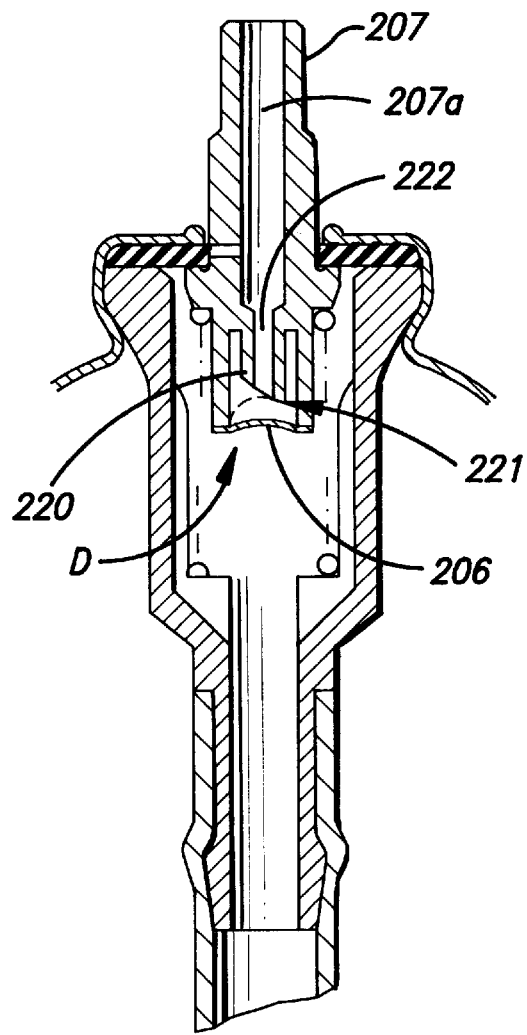
FIG. 3 shows a partial axial section of a pressurized container provided with a valve in accordance with the invention, according to another variant of the embodiment of FIG. 1.

The valve 204 represented in FIG. 3 has a safety device D, where, as compared with the embodiment of FIG. 1, the stopper 6 has been replaced by a membrane 206 closing an axial duct 207a of the stem 207.

The membrane 206 is made of a thin thermodeformable sheet, for example, of polyethylene terephthalate, whose softening point is approximately 65° C. In the vicinity of this membrane, the stem 207 has a hollow perforator 220 whose tip 221 is directed towards the membrane. The inside 222 of this perforator 220 communicates with the axial duct 207a of the stem 207.

The safety device D of FIG. 3 functions as follows. When a threshold temperature, for example 65° C., has been exceeded inside the container, the membrane 206 is subjected to elongation and advances under the effect of the pressure in the direction towards the perforator 220, as represented by a dotted line. The perforator pierces the membrane 206, and the pressurized propellant gas escapes from the container until the container has been completely depressurized via the hollow perforator.

The distance between the membrane 206 and the tip 221 has been calculated in such a way that the elongation of the membrane should be sufficient to bring it into contact with the tip 221.

What is claimed is:

1. A pressurized container containing a fluid product to be dispensed and a propellant gas, the container having a valve for dispensing the product, wherein the valve comprises a heat-sensitive safety device in an inside of the container for causing the valve to open and causing the inside of the container to permanently communicate with an outside of the container when a temperature inside the container exceeds a threshold temperature, wherein said safety device comprises a stopper made of a material that is thermodeformable at said threshold temperature, said stopper obturating an orifice between the inside of the container and the outside of the container when the threshold temperature has not been exceeded, and opening said orifice when the threshold temperature has been exceeded, wherein said stopper comprises a membrane capable of softening when the temperature inside the container exceeds the threshold temperature, the increase in temperature entailing an increase in the internal pressure in the container producing a displacement of the membrane, and further comprising a perforator for piercing the membrane when this displacement occurs.

2. A pressurized container comprising:

a valve for dispensing a product in the container through an orifice, said valve having a first passageway for selective release of the product through said orifice and a second passageway for venting an interior of the container through said orifice when the interior of the container reaches a threshold temperature;

a perforator in said second passageway; and a thermodeformable membrane inside the container and closing said second passageway when the interior of the container is below the threshold temperature, said thermodeformable membrane comprising a material that softens and deforms at the threshold temperature so as to be pierced by said perforator to open said second passageway.

3. The container of claim 2, wherein said orifice, said second passageway, said perforator, and said membrane are axially aligned.

* * * * *